United States Patent [19]

Kajiki

[11] Patent Number: 5,694,235
[45] Date of Patent: Dec. 2, 1997

[54] THREE-DIMENSIONAL MOVING IMAGE RECORDING/REPRODUCING SYSTEM WHICH IS COMPACT IN SIZE AND EASY IN RECORDING AND REPRODUCING A THREE-DIMENSIONAL MOVING IMAGE

[75] Inventor: Yoshihiro Kajiki, Tokyo, Japan

[73] Assignees: Telecommunications Advancement Organization of Japan; NEC Corporation, both of Tokyo, Japan

[21] Appl. No.: 612,463

[22] Filed: Mar. 7, 1996

[30] Foreign Application Priority Data

Mar. 17, 1995 [JP] Japan .................... 7-059424

[51] Int. Cl.⁶ .................................... G02B 26/08
[52] U.S. Cl. .................... 359/202; 359/201; 359/204; 359/213; 359/216
[58] Field of Search ................ 359/201–205, 359/212–219, 305; 347/233, 239, 243, 259–261; 348/98–99, 195, 203–205, 209–210; 250/234–236, 559.05–559.07, 559.11, 578.1

[56] References Cited

U.S. PATENT DOCUMENTS

| | | | |
|---|---|---|---|
| 4,097,115 | 6/1978 | Garwin et al. | 359/202 |
| 4,698,498 | 10/1987 | Mahoney et al. | 359/201 |
| 5,149,696 | 9/1992 | Fouilloy et al. | 359/201 |
| 5,172,251 | 12/1992 | Benton et al. | |
| 5,276,546 | 1/1994 | Palm et al. | 359/202 |
| 5,309,273 | 5/1994 | Mori et al. | 359/202 |

OTHER PUBLICATIONS

Pierre St. Hilaire et al., "Electronic display system for computational holography," *Practical Holography IV*, SPIE vol. 1212, 1990, pp. 174–182.

*Primary Examiner*—James Phan
*Attorney, Agent, or Firm*—Burns, Doane, Swecker & Mathis, LLP

[57] ABSTRACT

Upon picking up an image, light beams passing through a focal point of an image-forming lens are directed to an optical detector array comprising a plurality of optical detectors. Each optical detector selectively receives a light beam passing through the focal point with a particular different angle. By two-dimensionally scanning the focal point at a high speed by the use of a polygonal mirror and a vertical scanning section, a parallactic image of an object placed at a pickup/display position is picked up at a particular angle. Upon display, the parallactic image taken in a particular direction is projected from each light source of a light source array to the focal point. The focal point is two-dimensionally scanned at a high speed so that a stereoscopic image is displayed on the pickup/display position.

5 Claims, 8 Drawing Sheets

THREE-DIMENSIONAL MOVING IMAGE RECORDING/REPRODUCING SYSTEM WHICH IS COMPACT IN SIZE AND EASY IN RECORDING AND REPRODUCING A THREE-DIMENSIONAL MOVING IMAGE

BACKGROUND OF THE INVENTION

This invention relates to a three-dimensional moving image recording device for use in medical, industrial, domestic, or other applications to electronically input a three-dimensional moving image, also to a three-dimensional moving image reproducing device for displaying the three-dimensional moving image in response to an electronic signal, and also to a three-dimensional moving image recording/reproducing system including the three-dimensional recording device and the three-dimensional reproducing device.

Proposals have been made of various types of three-dimensional moving image recording and reproducing devices, for example, a three-dimensional moving image recording device comprising a binocular stereo camera, a three-dimensional moving image reproducing device comprising a stereoscope, and a three-dimensional moving image reproducing device using a lenticular sheet (LS) to obtain two parallactic images. There is also known a three-dimensional image recording/reproducing technique utilizing an interference of coherent light, called holography. Further, a three-dimensional moving image reproducing technique utilizing the holography is described in detail in SPIE Proceedings, Vol. 1212, p. 174, January 1990. Moreover, a three-dimensional display system utilizing the holography is disclosed in U.S. Pat. No. 5,172,251.

In the conventional three-dimensional moving image recording device such as the binocular stereo camera, the conventional three-dimensional moving image reproducing device such as the binocular stereoscope, and the three-dimensional moving image reproducing device using the lenticular sheet (LS) to obtain the two parallactic images, an observer acquires a stereognostic sense resulting from a binocular parallax between two images. However, a converging angle is fixedly determined by a lens interval and a distance between a camera and an object when the images are picked up. Upon observation, another converging angle formed by two eyes does not often coincide with the converging angle corresponding to the distance to a stereoscopic image. In addition, a focal point is fixed when the images are picked up. Therefore, fuzzy images are produced for any other objects remote from a focal plane. Due to the above-mentioned problems, continuous observation for a long time often causes the observer to feel headache or nausea. Sometimes, this would cause a serious medical problem such as a vision defect and a nerve defect.

In case of a multi-view stereo camera or a multi-ocular stereoscope, such an unnatural stereoscopic vision is alleviated by the use of an increased number of parallaxes. However, there arises another problem that a large space is required to accommodate a number of cameras and projectors. As a result, the device inevitably has a large scale.

In the three-dimensional moving image recording device and the three-dimensional moving image reproducing device utilizing the lenticular sheet (LS) or an integral photography (IP), the lens interval should be widened in order to increase the number of the parallaxes, assuming that a pixel size is constant. In case of the photograph and the cinematograph using a silver halide film, the number of the parallaxes can be increased to some extent because the pixel size is small.

However, in case of the three-dimensional moving image recording device and the three-dimensional moving image reproducing device of an electronic system, the pixel size is greater than that of the silver halide film. In this event, with the increase of the number of the parallaxes, the lens interval is increased to deteriorate a resolution of the stereoscopic image. For example, it is assumed that a liquid crystal display panel has a pixel size of 0.1 mm and that the lenticular sheet (LS) is kept in tight contact with the liquid crystal display panel to display an image of 30 parallaxes. In this case, the pitch of the lenticular sheet (LS) is equal to 3 mm and the displayed image has a resolution as low as 3 mm. For a three-dimensional object present in the vicinity of a lenticular sheet (LS) surface, the depth resolution limit is given by:

$$\begin{bmatrix} \text{Depth} \\ \text{Resolution} \\ \text{Limit} \end{bmatrix} = 2 \times \begin{bmatrix} \text{Lens} \\ \text{Interval} \end{bmatrix} \times \begin{bmatrix} \text{Viewing} \\ \text{Distance} \end{bmatrix} \div \begin{bmatrix} \text{Distance} \\ \text{between} \\ \text{Human Eyes} \end{bmatrix}$$

It is assumed here that the distance (viewing distance) between the observer and the lenticular sheet (LS) is equal to 500 mm and that the distance between human eyes is equal to 62.5 mm. In this event, the depth resolution limit in the above-mentioned design condition has a rather poor value on the order of 48 mm.

In the three-dimensional moving image reproducing device using the lenticular sheet (LS) or the integral photography (IP) of a multiparallax type, the displayed image is difficult to prepare. At a first glance, it seems that the displayed image can be readily prepared by the use of a picked-up image taken by the three-dimensional moving image recording device using the lenticular sheet (LS) or the integral photography (IP) of a similar structure. In fact, however, the picked-up image is observed in a reverse direction, namely, from a back side, called pseudoscopic. Without any further processing, the displayed image is reverse to an original image of the three-dimensional object with its front side turned back. Such an image will be referred to as a pseudoscopic image hereinafter. For example, when a human face is taken, a strange image is displayed as if a mask is viewed from inside.

Restoration of the original image from the pseudoscopic image is not easy and generally requires image processing by a computer or other special circuit. In order to optically restore the original image from the pseudoscopic image, it is proposed to use two lenticular sheets (LS) of the same pitch. In this case, however, a high precision is required in positioning the two lenticular sheets.

Furthermore, any of the above-mentioned conventional devices is not suitable for recordal and reproduction of a moving image of the three-dimensional object.

SUMMARY OF THE INVENTION

It is an object of this invention to provide a three-dimensional moving image recording device which is compact in size and which is adapted to record a moving image of a three-dimensional object.

It is another object of this invention to provide a three-dimensional moving image reproducing device which is compact in size and which is adapted to reproduce a moving image of a three-dimensional object.

It is a further object of this invention to provide a three-dimensional moving image recording/reproducing system which is capable of easily reproducing a three-dimensional image without a problem of a pseudoscopic image.

According to this invention, there is provided a three-dimensional moving image recording device comprising a plurality of optical detectors optically arranged so as to totally receive light beams within a limited solid angle among those light beams passing through a particular viewing point in a space, the optical detectors being located so as to individually receive the light beams advancing in different directions, respectively, among those light beams passing through the above-mentioned same viewing point, a scanning mechanism for vertically and horizontally scanning the viewing point or an image of the viewing point at a high speed by the use of an optical scanning apparatus such as a polygonal mirror, a galvano mirror, and an acousto-optic (AO) crystal, and a measuring mechanism for electronically measuring a time-varying luminous energy incident to each of the optical detectors to produce a measurement value and for recording or transmitting the measurement value.

According to this invention, there is also provided a three-dimensional moving image reproducing device comprising a plurality of light sources optically arranged so that light beams emitted therefrom are totally converged onto a particular converging point in a space within a limited solid angle, said light sources being located so that the light beams emitted therefrom are individually converged onto the same converging point from different directions, respectively, a scanning mechanism for vertically and horizontally scanning the converging point or an image of the converging point at a high speed by the use of an optical scanning apparatus such as a polygonal mirror, a galvano mirror, and an acousto-optic (AO) crystal, and a modulating mechanism for modulating a luminous energy of each of said light sources in response to electronic stereoscopic video information.

According to this invention, there is also provided a three-dimensional moving image recording/reproducing system comprising a combination of the above-mentioned three-dimensional moving image recording device and the above-mentioned three-dimensional moving image reproducing device, comprising an optical path branching mechanism, such as a movable mirror or a half mirror, for branching an optical path so that the viewing point of the three-dimensional moving image recording device is coincident with the converging point of the three-dimensional moving image reproducing device to thereby enable common use of a single scanning apparatus as the scanning mechanism both in the three-dimensional moving image recording device and in the three-dimensional moving image reproducing device.

DESCRIPTION OF THE PREFERRED EMBODIMENTS

In order to facilitate an understanding of this invention, a conventional three-dimensional moving image recording device and a conventional three-dimensional moving image reproducing device will at first be described with reference to FIGS. 1 through 4.

Among a variety of conventional three-dimensional moving picture recording devices, a typical one known as a stereo camera will be described. In the example illustrated in FIG. 1, an image of an object 1 is picked up by left and right image-forming lenses 2 to be projected on two photographic plates 32. A pair of images recorded on the two photographic plates 32 have a parallax corresponding to an interval between the image-forming lenses 2 and are therefore given as stereoscopic information on the principle similar to that of triangulation. An electronic stereo camera is also known which comprises camera tubes or charge coupled devices instead of the photographic plates illustrated in FIG. 1. Proposal has also been made of a so-called multi-view stereo camera comprising an increased number of image-forming lenses and photographic plates to record parallactic images taken in a number of directions.

Figure 1:
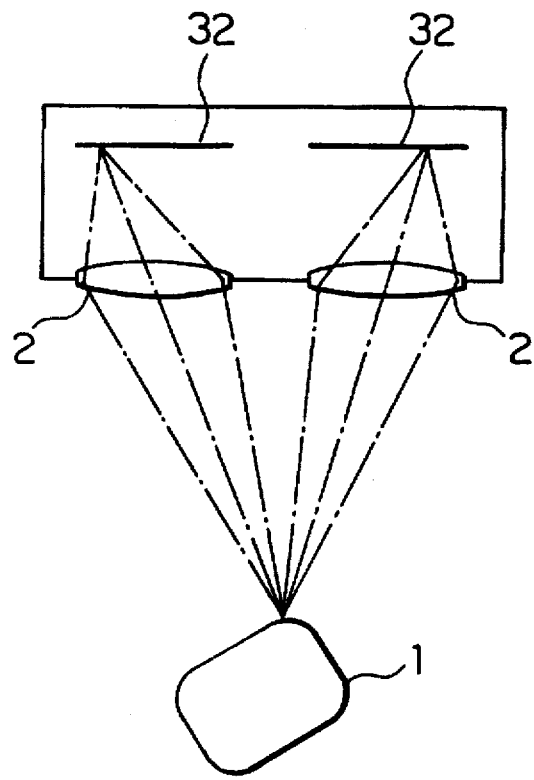
FIG. 1 shows a structure of a stereo camera as a conventional three-dimensional moving image recording device.
Figure 2:
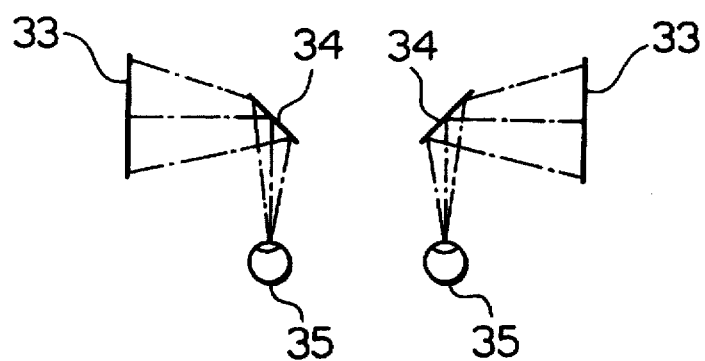
FIG. 2 shows a structure of a stereoscope as a conventional three-dimensional moving image reproducing device.

On the other hand, among a variety of conventional three-dimensional moving picture reproducing devices, a typical one known as a stereoscope is illustrated in FIG. 2. In the illustrated three-dimensional moving picture reproducing device, two photographs corresponding to left and right images picked up by the stereo camera in FIG. 1 are observed through mirrors 34 by left and right eyes 35. Thus, a stereoscopic video image is displayed. Since video images recorded on the two photographs have a parallax, one can recognize stereoscopic reproduction of the object by the help of binocular parallax.

Proposal has also been made of an electronic three-dimensional moving image reproducing device comprising Braun tubes or liquid crystal displays instead of the photographs 33. Also, a so-called multi-view three-dimensional moving image reproducing device is proposed which includes an increased number of photographs to display parallactic images taken in a number of directions.

Figure 3:
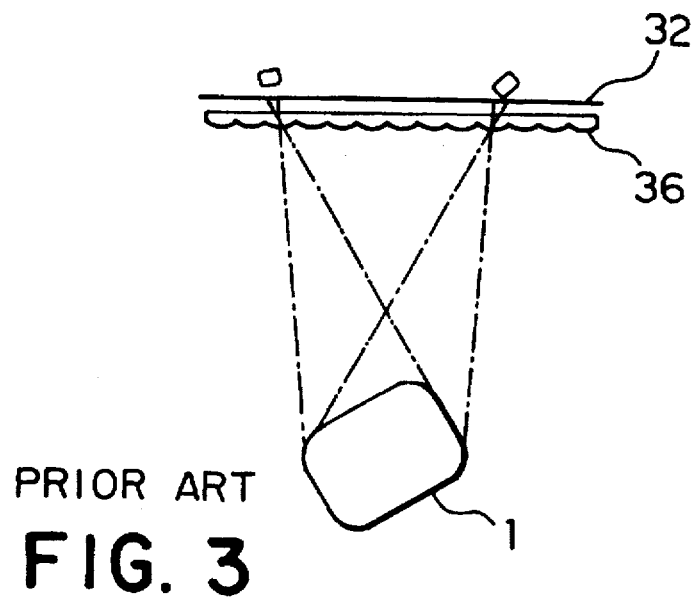
FIG. 3 is a view for describing another conventional three-dimensional moving image recording device using a lenticular sheet.

FIG. 3 shows, as another typical conventional three-dimensional moving image recording device, a stereo camera using small cylindrical lenses (lenticular sheet). As illustrated in FIG. 3, this stereo camera comprises the photographic plate 32 and a lenticular sheet (abbreviated to LS hereinafter) 36 composed of an array of a number of small cylindrical lenses and arranged in tight contact with the photographic plate 32. The image of the object 1 is recorded on the photo-graphic plate 32. Through the cylindrical lenses of the LS 36, those images taken in various directions are recorded on the photographic plate 32. Thus, three-dimensional video information is recorded.

It is noted here that, in a normal position, human eyes are aligned in a horizontal direction. In this connection, the binocular parallax is mainly a horizontal parallax. Generally, a viewing point is frequently moved in the horizontal direction when walking or rotating a neck. On the other hand, the viewing point is rarely moved in a vertical direction. Accordingly, a vertical parallax is not so important in practice. Even with such LS-based system for recording and displaying the horizontal parallactic images alone, a sufficient stereognostic sense can be obtained.

Since the LS-based system displays the horizontal parallactic images alone as described above, it is theoretically believed that an integral photography (abbreviated to IP hereinafter) comprising an array of a number of spherical lenses can display a more natural stereoscopic image. However, such an IP is not put into practical use because of an extreme difficulty in manufacture of a fly's eye lens composed of an array of a number of spherical lenses and in positioning with respect to the photographic plate.

Figure 4:
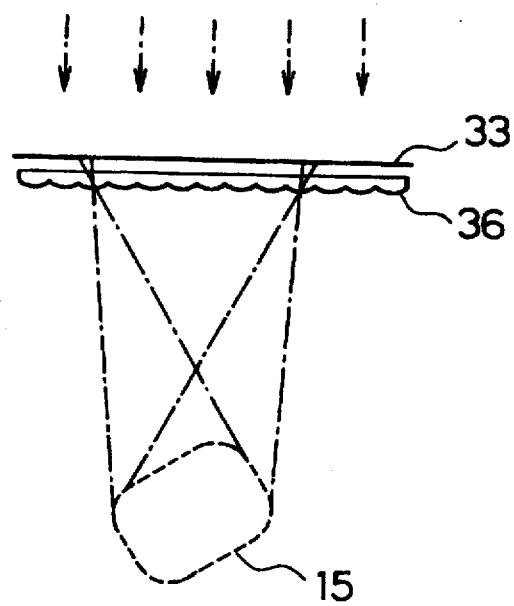
FIG. 4 is a view for describing another conventional three-dimensional moving image reproducing device using a lenticular sheet.
Figure 4:
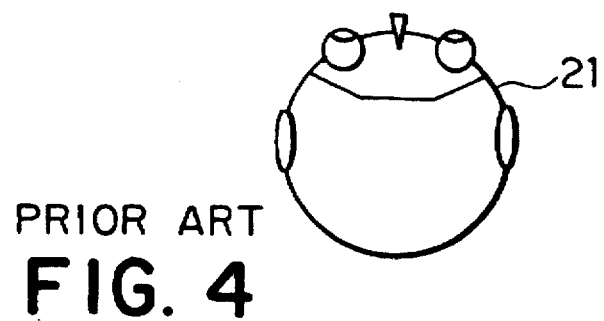

On the other hand, FIG. 4 shows another conventional three-dimensional moving image reproducing device using the lenticular sheet (LS) 36. As illustrated in the figure, a photograph 33 is located on a focal plane of the LS 36 and illuminated from a rear side of the LS 36. When an observer 21 observes the device from a front side of the LS 36, a vertical line on the photograph is apparently enlarged through each of the cylindrical lenses of the LS 36 to a width of each cylindrical lens. Dependent on a viewing direction of viewing the cylindrical lenses, an apparent position of the line on the photograph is different. By recording on the photograph those vertical lines with the parallaxes corresponding to the different viewing directions, it is possible as a whole of the photograph to observe a three-dimensional image 15 in the space.

As described in the preamble of the instant specification, there is also known the three-dimensional image recording/reproducing technique utilizing the holography.

In the conventional three-dimensional moving image recording device such as the binocular stereo camera, the conventional three-dimensional moving image reproducing device such as the binocular stereoscope, and the three-dimensional moving image reproducing device using the LS to obtain the two parallactic images, the observer acquires a stereognostic sense resulting from the binocular parallax between the two images. However, a converging angle is fixedly determined by a lens interval and a distance between a camera and an object when the images are picked up. Upon observation, a converging angle formed by two eyes does not often coincide with a desired converging angle corresponding to a distance to a stereoscopic image. In addition, a focal point is fixed when the images are picked up. Therefore, a fuzzy image is produced for any object remote from a focal plane. Due to the above-mentioned problems, continuous observation for a long time often causes the observer to feel headache or nausea. Sometimes, this would cause a serious medical problem such as a vision defect and a nerve defect.

In case of a multi-view stereo camera or a multi-view stereoscope, such an unnatural stereoscopic vision is alleviated by the use of an increased number of parallaxes. However, there arises another problem that a large space is required to accommodate a number of cameras and projectors. As a result, the device inevitably has a large scale.

In the three-dimensional moving image recording device and the three-dimensional moving image reproducing device utilizing the LS or the IP, the lens interval should be widened in order to increase the number of the parallaxes, assuming that a pixel size is constant. In case of the photograph and the cinematograph using a silver halide film, the number of the parallaxes can be increased to some extent because the pixel size is small.

However, in case of the three-dimensional moving image recording device and the three-dimensional moving image reproducing device of an electronic system, the pixel size is greater than that of the silver halide film. In this event, with the increase of the number of the parallaxes, the lens interval is increased to deteriorate a resolution of the stereoscopic image. For example, it is assumed that a liquid crystal display panel has a pixel size of 0.1 mm and that the LS is kept in tight contact with the liquid crystal display panel to display an image of 30 parallaxes. In this case, the pitch of the LS is equal to 3 mm and the displayed image has a resolution as low as 3 mm. For a three-dimensional object present in the vicinity of a LS surface, the depth resolution limit is given by:

$$\begin{bmatrix} \text{Depth} \\ \text{Resolution} \\ \text{Limit} \end{bmatrix} = 2 \times \begin{bmatrix} \text{Lens} \\ \text{Interval} \end{bmatrix} \times \begin{bmatrix} \text{Viewing} \\ \text{Distance} \end{bmatrix} + \begin{bmatrix} \text{Distance} \\ \text{between} \\ \text{Human Eyes} \end{bmatrix}$$

It is assumed here that the distance (viewing distance) between the observer and the LS is equal to 500 mm and that the distance between human eyes is equal to 62.5 mm. In this event, the depth resolution limit in the above-mentioned design condition has a rather poor value on the order of 48 mm.

In the three-dimensional moving image reproducing device using the LS or the IP of a multiparallax type, the displayed image is difficult to prepare. At a first glance, it seems that the displayed image can be readily prepared by the use of a picked-up image taken by the three-dimensional moving image recording device using the LS or the IP of a similar structure. In fact, however, the picked-up image is observed in a reverse direction, namely, from a back side, called pseudoscopic. Without any further processing, the displayed image is reverse to an original image of the three-dimensional object with its front side turned back. Such an image will be referred to as a pseudoscopic image hereinafter. For example, when a human face is taken, a strange image is displayed as if a mask is viewed from inside.

Restoration of the original image from the pseudoscopic image is not easy and generally requires image processing by a computer or other special circuit. In order to optically restore the original image from the pseudoscopic image, it is proposed to use two LS's of the same pitch. In this case, however, a high precision is required in positioning the two lenticular sheets.

Furthermore, any of the above-mentioned conventional devices is not suitable for recordal and reproduction of a moving image of the three-dimensional object.

Now, description will be made as regards several embodiments of this invention with reference to the drawing.

Figure 5:
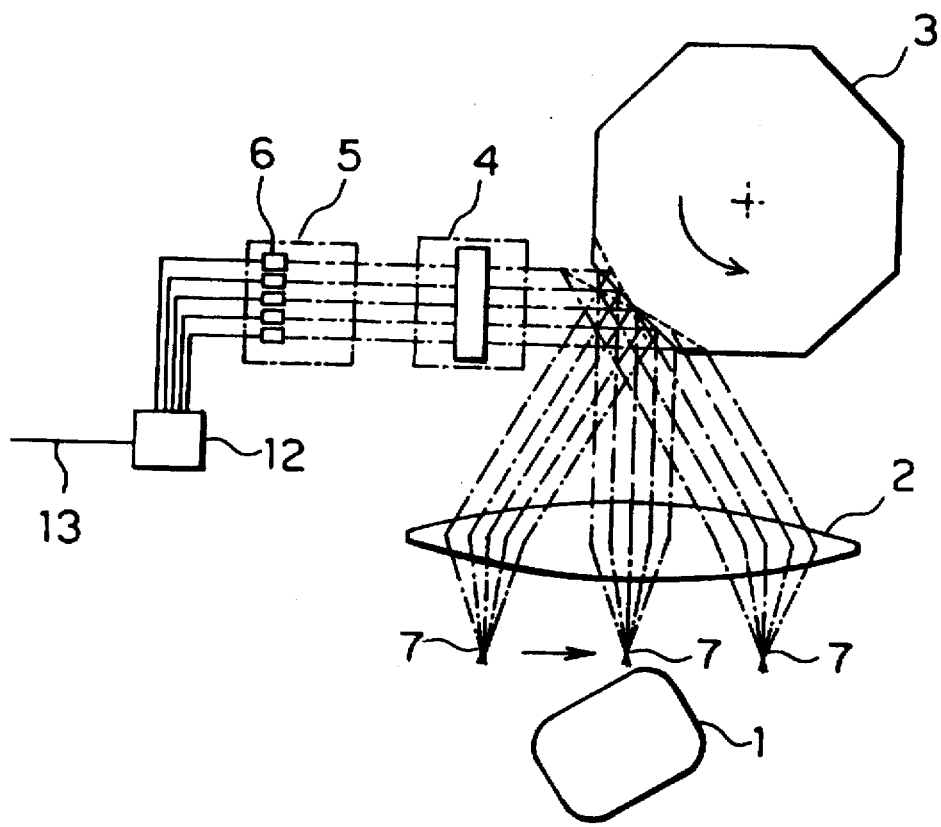
FIG. 5 is a view for describing a three-dimensional moving image recording device according to a first embodiment of this invention.

FIG. 5 shows an entire arrangement of a three-dimensional moving image recording device (a stereo camera) according to a first embodiment of this invention. In the figure, a horizontal optical path is mainly shown. The stereo camera comprises, as a structure relating to the horizontal path, an image-forming lens 2, a polygonal mirror 3, a vertical scanning section 4, an optical detector array 5, a video recorder 12, and a transmission line 13.

Figure 6:
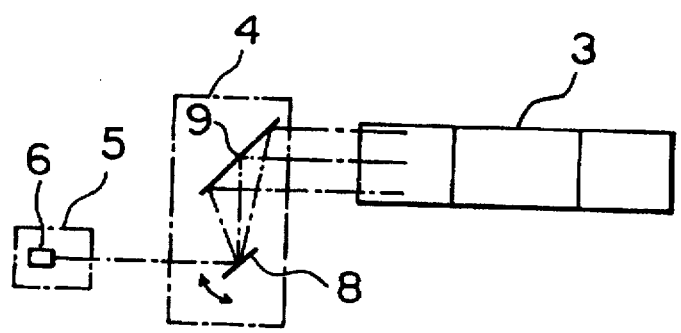
FIG. 6 shows a vertical optical path usable in the three-dimensional moving image recording device illustrated in FIG. 5.

FIG. 6 shows a vertical optical path of the three-dimensional moving image recording device illustrated in FIG. 5. As illustrated in the figure, the vertical scanning section 4 further comprises a galvano mirror 8 and a mirror 9 in addition to the structure relating to the horizontal optical path. Practically, as illustrated in FIG. 5, the image-forming lens 2 is located in front of the polygonal mirror 3 and the video recorder 12 and the transmission line 13 are arranged at the side of the optical detector array 5. These components are omitted in FIG. 6 for convenience of illustration.

Figure 7:
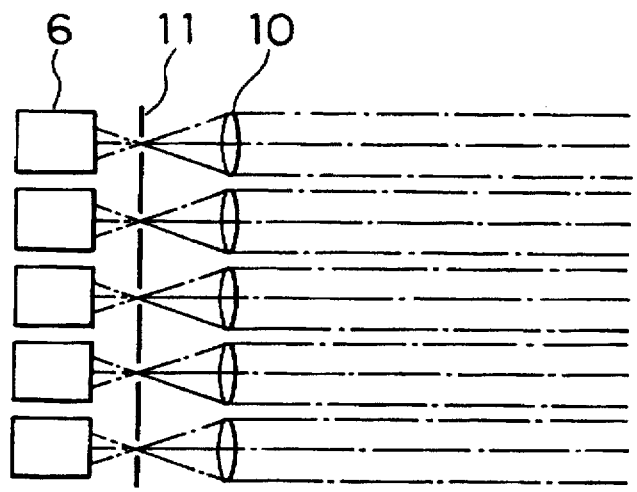
FIG. 7 shows an optical detector array usable in the three-dimensional moving image recording device illustrated in FIG. 5.

FIG. 7 shows a structure of the optical detector array 5 of the first embodiment illustrated in FIG. 5. The optical detector array 5 comprises a plurality of condenser lenses 10, an aperture 11 having a plurality of openings, and a plurality of optical detectors 6.

Referring to FIGS. 5, 6, and 7, operation of the three-dimensional moving image recording device will be described. Light beams passing through a viewing point 7 are directed through the image-forming lens 2, the polygonal mirror 3, and the vertical scanning section 4 to the optical detector array 5. The viewing point 7 is located on a focal plane of the image-forming lens 2. The light beams passing through each viewing point 7 are converted by the image-forming lens 2 into a parallel flux. A distance from the center of the flux to each of the light beams corresponds to an incident angle with respect to the viewing point 7. This correspondence is maintained until the flux is incident through the polygonal mirror 3 and the vertical scanning section 4 to the optical detector array 5.

The optical detector array 5 comprises a plurality of the condenser lenses 10 arranged in an array. The flux incident to the optical detector array 5 is split into split beams incident to the respective condenser lenses 10. The aperture 11 is located on a focal plane of the condenser lenses 10. The openings of the aperture 11 pass the split beams while the light beams except those passing through the viewing point 7 are intercepted. Behind the aperture 11, the optical detectors 6 are arranged. Each optical detector 6 is for receiving the light beams passing through each condenser lens 10 to convert a luminous energy into an electric signal. The luminous energy incident to each optical detector 6 corresponds to that of the light beams passing through the viewing point 7 with a particular incident angle. Thus, each optical detector 6 is arranged so as to receive the light beam advancing in each different direction among those passing through the same viewing point 7.

The polygonal mirror 3 has reflecting surfaces located at a focal point of the image-forming lens 2. When the polygonal mirror 3 is rotated, the viewing point 7 is horizontally scanned with a constant relationship kept between the incident angle of the light beam incident to the viewing point 7 and the incident angle of the light beam incident to the optical detector array 5. When the galvano mirror 8 is vibrated, the viewing point 7 is vertically scanned.

In FIG. 7, only five pairs of the condenser lenses 10 and the optical detectors 6 are shown for simplicity of illustration. Practically, a large number of microlenses and photodiodes are arranged in an array. In a specific example, the image-forming lens 2 has a focal length of 100 mm. The condenser lenses 10 and the optical detectors 6, 30 in number, are arranged at an interval of 1 mm. In this event, the light beams received by the optical detectors 6 correspond to the light beams passing through the viewing point 7 at every angular offset of 0.57 degree. An entire arrangement of the thirty optical detectors 6 receives the light beams within a range of about 17 degrees.

Experimentally, the polygonal mirror 3 of the illustrated three-dimensional moving image recording device has 16 reflecting surfaces and is rotated at 6000 rpm. In addition, the galvano mirror 8 is driven by a sawtooth wave having a frequency on the order of 32 Hz. In this event, the polygonal mirror 3 is rotated with 50 times alternation of the reflecting surfaces during a single reciprocal movement of the galvano mirror 8. By raster scanning like in a domestic television set, the viewing point 7 can be transferred into a two-dimensional image by the use of fifty scanning lines at a renewing speed of 31 frames per second.

When an object 1 is located in front of the viewing point 7, a time-varying signal from each optical detector 6 corresponds to a parallactic image taken in a predetermined direction. The time-varying signal from each optical detector 6 is recorded by the video recorder 12 or transmitted to other apparatus through the transmission line 13. Thus, movement of the parallactic image of the object 1, namely, a stereoscopic moving image can be recorded and transmitted.

In the above-mentioned embodiment, the parallactic image is taken over the range of about 17 degrees in thirty directions at an angular offset of 0.57. This embodiment has a characteristic that the offset of the parallax is very small.

In this invention, a plurality of the optical detectors 6 are arranged so that a whole structure of the three-dimensional moving image recording device is prevented from being increased in size.

The resolution of each parallactic image is not dependent upon the number of parallaxes, unlike the conventional three-dimensional moving image recording device of the LS-based system. With the photodiodes having a frequency band of 1 MHz, a single horizontal scanning operation can resolve the information corresponding to 625 pixels and can pick up the pixels of the number equivalent to that of the typical domestic television set. The frequency band of 1 MHz is readily obtained by ordinary photodiodes for communication.

Display operation of the stereoscopic moving image thus picked up will later be described.

Figure 8:
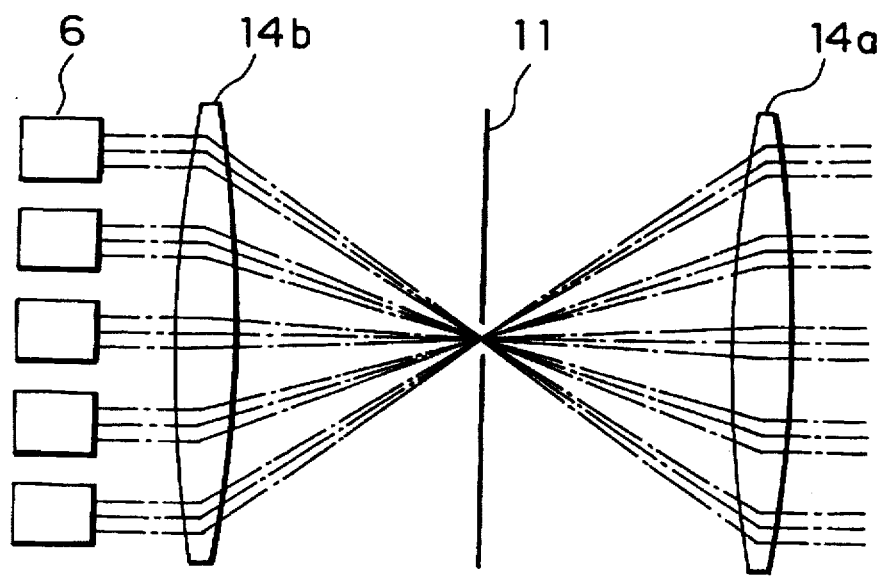
FIG. 8 shows another optical detector array usable in the three-dimensional moving image recording device illustrated in FIG. 5.

FIG. 8 shows another optical detector array 5 usable in the three-dimensional moving image recording device illustrated in FIG. 5. The other components are similar to those illustrated in FIGS. 1 and 2. The optical detector array 5 illustrated in the figure comprises a first convex lens 14a, a second convex lens 14b, the aperture 11, and a plurality of the optical detectors 6.

Referring to FIGS. 5, 6, and 8, operation of this embodiment will be described. The flux of the light beams is incident to the optical detector array 5 in the manner similar to that illustrated in FIGS. 5 and 6 and is converged by the first convex lens 14a. The aperture 11 is located at a focal point of the first convex lens 14a to intercept the light beams except those passing through the viewing point 7.

On the other hand, the second convex lens 14b is located behind the aperture 11 so that an opening of the aperture 11 coincides with a focal point of the second convex lens 14b. A large number of the optical detectors 6 are arranged within the flux passing through the second convex lens 14b. The luminous energy incident to each optical detector 6 corresponds to that of the light beams passing through the viewing point 7 at a particular incident angle. Other operation is similar to that of the optical detector array 5 in FIG. 7 and will not be repeatedly described.

In FIG. 8, only five optical detectors 6 are shown for convenience of illustration. Practically, a large number of photodiodes are arranged in an array. In a specific example, the first convex lens 14a has a focal length of 30 mm while the second convex lens 14b has a focal length of 150 mm. The optical detectors 6, 30 in number, are arranged at an interval of 5 mm. The image-forming lens 2 is equivalent to that used in the first embodiment. The offset of the parallactic images is equal to 0.57 degrees like the first embodiment.

A combination of the two convex lenses and the aperture forms a spatial filter so that the interval of the optical detectors can be widened. Accordingly, ordinary lenses and diodes can be used instead of the microlenses and the photodiode array. In this case, the characteristic of FIG. 3 is not deteriorated.

In the embodiment illustrated in FIGS. 5 through 8, the viewing point 7 is located on the focal plane of the image-forming lens 2. This is because the flux passing through the image-forming lens 2 is rendered into the parallel beams to thereby minimize the size of the polygonal mirror 3. Provided that the light beams passing through the viewing point 7 are directed to the optical detectors 6, the viewing point may be located outside the focal plane of the image-forming lens 2. The reflecting surfaces of the polygonal mirror 3 are located at the focal point of the image-forming lens 2 in order to make the signal produced by each optical detector 6 correspond to the parallactic image of the object 1 taken in the predetermined direction so as to facilitate reproduction and display. However, the reflecting surfaces may not be located at the focal point. With respect to the vertical scanning operation, a cylindrical lens may be inserted between the galvano mirror 8 and the image-forming lens 2 and the galvano mirror 8 is positioned at the focal point of the image-forming lens 2. When an image is formed on the galvano mirror 8, the viewing point 7 can be vertically scanned with the optical path on a horizontal scanning plane kept horizontal. Accordingly, reproduction and display can be easily carried out.

In order to scan the viewing point 7, raster scanning is used in which the polygonal mirror 3 is rotated at a high speed and the galvano mirror 8 is driven by the sawtooth wave of 32 Hz. Alternatively, a resonance scanner is used instead of the galvano mirror 8 to perform reciprocal scanning in the vertical direction at a speed as high as 8 kHz while the rotation speed of the polygonal mirror 3 for horizontal scanning is slowed down. Alternatively, another galvano mirror may be used instead of the polygonal mirror 3.

In FIG. 8, the flux incident to the optical detector array 5 is converged by the first convex lens 14a. This is optically equivalent to a structure that a composite lens comprising the image-forming lens 2 and the first convex lens 14a forms the image of the viewing point 7 on the aperture 11. The first convex lens 14a may be omitted. Alternatively, another lens may be added therebetween. In the foregoing embodiment, the second convex lens 14b is located behind the aperture 11 to restore the flux of the parallel beams. Alternatively, the optical detectors 6 may be arranged in a radial fashion to omit the second convex lens 14b.

Figure 9:
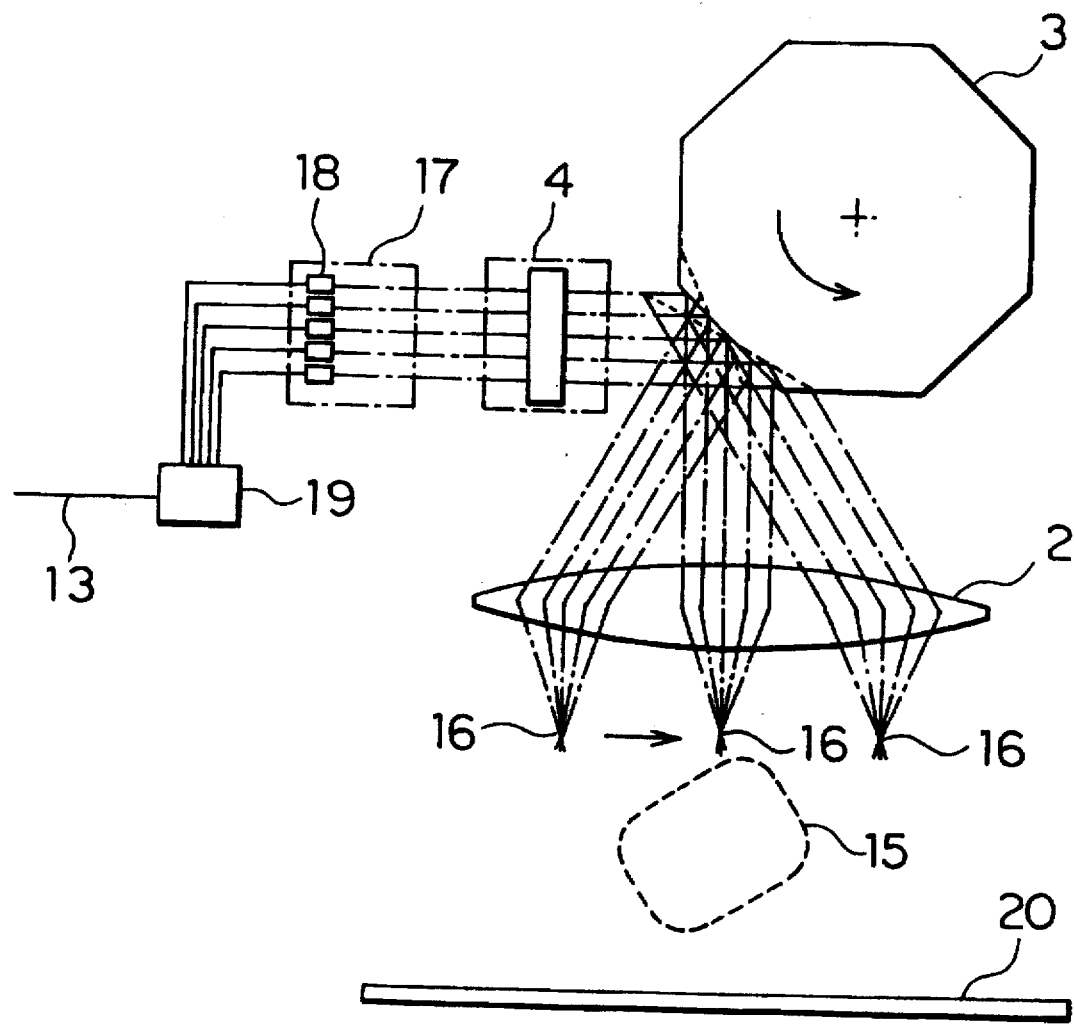
FIG. 9 is a view for describing a three-dimensional moving image reproducing device according to a second embodiment of this invention.
Figure 9:
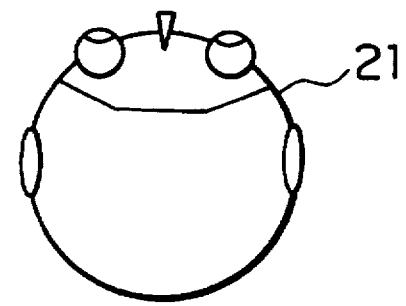

FIG. 9 shows a three-dimensional moving image reproducing device according to a second embodiment of this invention. Herein, a horizontal optical path of a stereo display is shown. An entire arrangement relating to the horizontal optical path comprises a vertical diffusion plate 20, the image-forming lens 2, the polygonal mirror 3, the vertical scanning section 4, a light source array 17, a modulator 19, and the transmission line 13.

Figure 10:
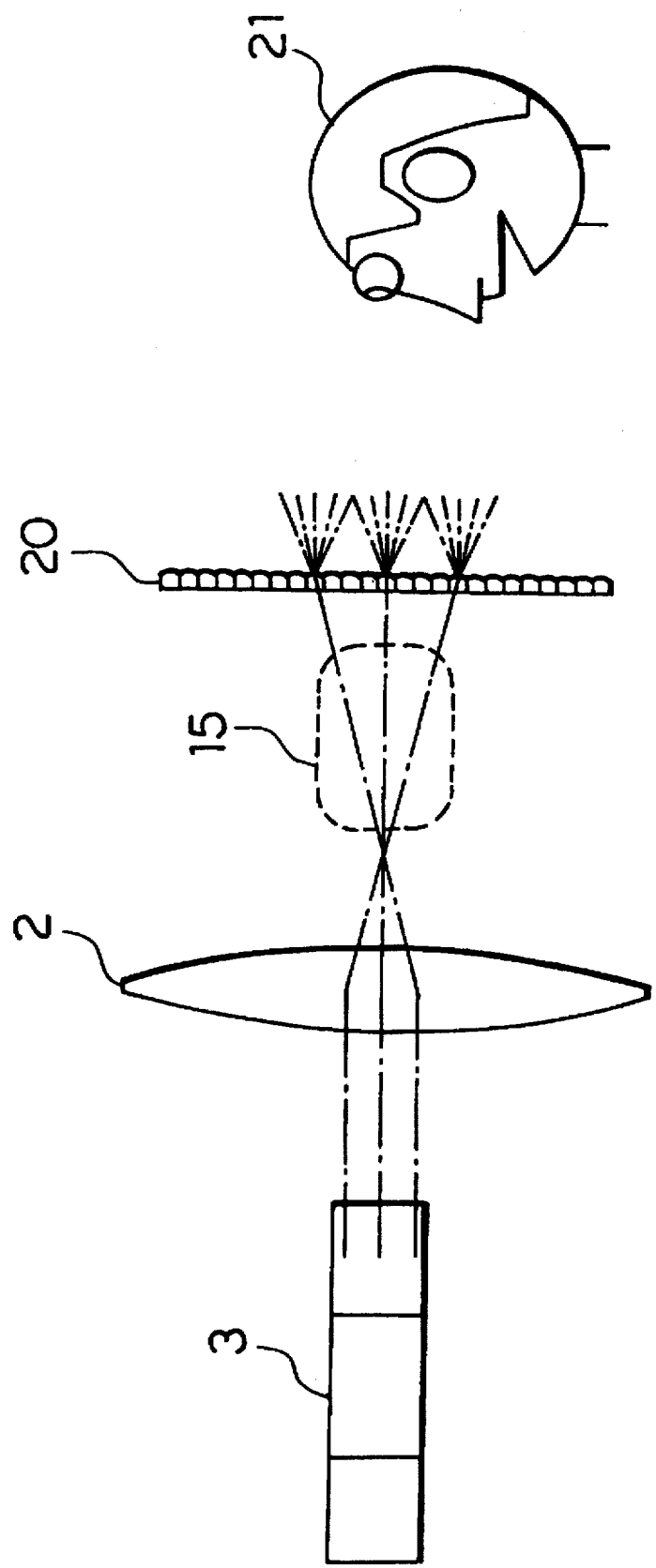
FIG. 10 shows a vertical optical path usable in the three-dimensional moving image reproducing device illustrated in FIG. 9.

FIG. 10 shows a vertical optical path of the three-dimensional moving image reproducing device illustrated in FIG. 9. Herein, the vertical diffusion plate 20 is arranged. The vertical diffusion plate 20 comprises, for example, an array of cylindrical lenses having a vertical curvature and is for diffusing light beams in a vertical direction alone. Herein, a lenticular sheet is used with its cylindrically curved direction turned round. Practically, the vertical scanning section 4, the light source array 17, the modulator 19, and the transmission line 13 are located in front of the polygonal mirror 3 although illustration is omitted in FIG. 10 for the purpose of simplification. The vertical scanning section 4 is equivalent to that illustrated in FIG. 6 and comprises the galvano mirror 8 and the mirror 9.

Figure 11:
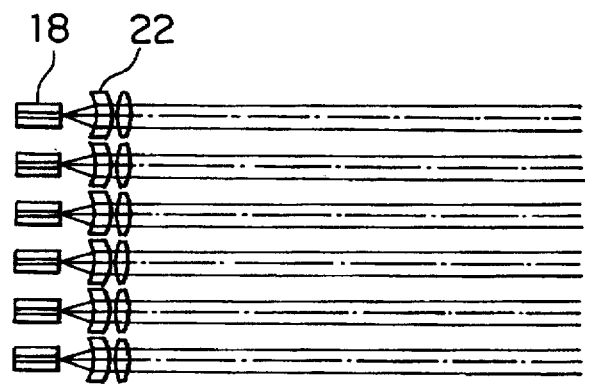
FIG. 11 shows a light source array usable in the three-dimensional moving image reproducing device illustrated in FIG. 9.

FIG. 11 shows in detail the light source array 17 of the three-dimensional moving image reproducing device illustrated in FIGS. 9 and 10. The light source array 17 comprises a plurality of collimate lenses 22 and a plurality of light sources 18.

Next, operation of the three-dimensional moving image reproducing device according to this embodiment will be described with reference to FIGS. 9, 10, and 11. Light beams emitted from the light sources 18 are directed through the collimate lenses 22, the vertical scanning section 4, and the image-forming lens 2 to a converging point 16 to be observed through the vertical diffusion plate 20 by an observer 21.

In this case, the light sources 18 are located at the focal points of the collimate lenses 22. The light beams passing through the collimate lenses 22 are converted into parallel beams. The light sources 18 and the collimate lenses 22 are arranged in parallel to each other. The light beams going out from the light source array 17 are converted into a flux composed of the parallel light beams. The flux is maintained even after passing through the galvano mirror 8 and the polygonal mirror 3 and is converged onto the focal plane of the image-forming lens 2. With this arrangement, the light beams emitted from a single one of the light sources 18 pass through the converging point 16 with a particular angle. Accordingly, by modulating the intensity of each individual light source 18, it is possible to desiredly modulate the intensity of the light beams passing through the converging point 16 with the particular angle.

In the manner similar to the three-dimensional moving image recording device described in conjunction with FIGS. 5 through 8, the reflecting surfaces of the polygonal mirror 3 are located at the focal point of the image-forming lens 2. When the polygonal mirror 3 is rotated, the converging point 16 is horizontally scanned with an angular relationship kept constant between the light source 18 and the light beam passing through the converging point 16. When the galvano mirror 8 is vibrated, the converging point 16 is vertically scanned.

By driving the polygonal mirror 3 and the galvano mirror 8 as described above, the converging point 16 can be two-dimensionally scanned at a high speed. An image obtained by modulating a single one of the light sources 18 in cooperation with the scanning operation is a parallactic image taken in a particular direction. Accordingly, a plurality of parallactic images deriving from the light sources 18 are made to overlap on a scanning plane of scanning the converging point 16. Thus, the parallactic images equal in number to the light sources 18 are projected around the converging point 16. When the light sources 18 are arranged in a horizontal direction alone as illustrated in FIG. 11, the light beams passing through the converging point 16 are distributed within a horizontal plane alone. As illustrated in FIG. 10, the vertical diffusion plate 20 is located forward of the space to which the parallactic images are projected, and diffuses the light beams in a vertical direction. As a consequence, the observer 21 observes through the vertical diffusion plate 20 a stereoscopic image 15 in the space to which the parallactic images are projected. The luminous energy of each of the light sources 18 is modulated by the modulator 19 in response to the stereoscopic video image information sent through the transmission line 13. The scanning operation is carried out in synchronism with the modulating operation. Thus, the stereoscopic moving image is displayed.

In FIG. 11, only five sets of the light sources 18 and the collimate lenses 22 are shown for simplification of illustration. Practically, a large number of microlenses and array lasers are arranged. In a specific example, the image-forming lens 2 has a focal length of 100 mm. The light sources 18 and the collimate lenses 22, 30 in number, are arranged at an interval of 1mm. In this event, the parallactic images projected from the individual light sources 18 have parallaxes offset at every 0.57 degree. An entire arrangement of the thirty light sources 18 projects the image over a range of about 17 degrees.

It is assumed that the observer 21 is present at a position spaced by 500 mm from the converging point 16. Since the distance between the human eyes is generally on the order of 62.5 mm, the stereoscopic image can be observed by two eyes with a margin on the order of 90 mm when the image is projected over the range of about 17 degrees. In addition, human pupils are generally opened to a diameter of about 5 mm in a room environment. If the offset of the parallactic images is not greater than 0.57 degrees, two or more parallactic images are incident into a single pupil. When two or more parallactic images are incident into the single pupil, two parallactic images overlap each other on a retina if an eyeball adjusts its focal point to a position of the stereoscopic image 15 in the space. In this event, a natural stereoscopic image is displayed as a result of adjustment of the focal point in addition to the binocular parallax and the convergence. As far as such natural vision is provided, no weariness is felt even after a long term observation and no medical problem is caused at all. The specification of the stereoscopic image is same as the image picked up by the three-dimensional moving image recording device illustrated in FIGS. 5 through 8. This also indicates that the three-dimensional moving image recording device in FIGS. 5 through 8 can pick up a natural stereoscopic image which enables adjustment of the focal point in addition to the binocular parallax and the convergence.

Two-dimensional scanning operation by the polygonal mirror or the galvano mirror is similar to that of the three-dimensional moving image recording device described above and will not be repeatedly described.

When the above-mentioned structure is used, the stereo display itself is not increased in size. The resolution of each parallactic image is not dependent upon the number of parallaxes, unlike a stereo projector of the LS-based system. When 625 pixels are displayed in a single horizontal scanning operation, the light source is required to have a frequency band of 1 MHz and the pixels equivalent in number to that in the typical domestic television set can be picked up. The frequency band of 1 MHz is readily obtained by direct modulation of a semiconductor laser or an LED for communication.

Figure 12:
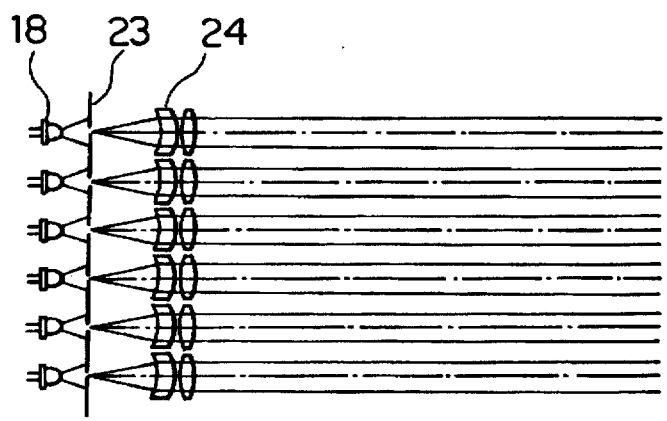
FIG. 12 shows another light source array usable in the three-dimensional moving image reproducing device illustrated in FIG. 9.

FIG. 12 shows another light source array usable in the three-dimensional moving image reproducing device illustrated in FIGS. 9 and 10. The light source array 17 illustrated in FIG. 12 comprises a plurality of the light sources 18, a mask 23, and a plurality of projector lenses 24.

Operation of this embodiment will hereafter be described with reference to FIGS. 9, 10, and 12. The light beams emitted from the light sources 18 illuminate the mask 23. The projector lenses 24 are arranged forward of the mask 23 so that the mask 23 is located at its focal point. Openings of the mask 23 are projected at an infinite distance. A number of sets of the light sources 18, the openings of the mask 23, and the projector lenses 24 are arranged in parallel to convert the light beams emitted from the light source array 17 into a flux composed of a number of the parallel beams. Other operation is similar to that of the foregoing embodiment and will not be described any longer.

By projecting the mask onto the converging point, a small spot can be formed on the converging point even if the light sources are difficult to collimate, for example, if the light sources comprises LED's. In this case also, the characteristic of the embodiment illustrated in FIGS. 9 and 10 is not deteriorated.

Figure 13:
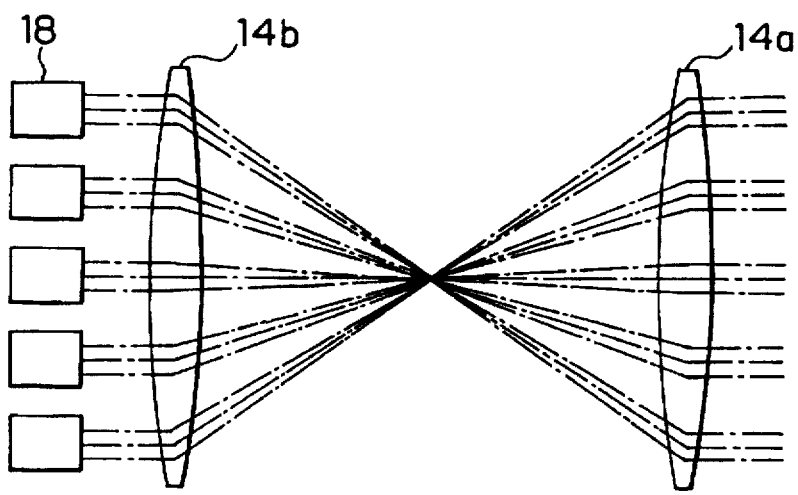
FIG. 13 shows a still another light source array usable in the three-dimensional moving image reproducing device illustrated in FIG. 9.

FIG. 13 shows still another light source array 17 usable in the three-dimensional moving image reproducing device illustrated in FIGS. 9 and 10. The illustrated light source array 17 comprises the first convex lens 14a, the second convex lens 14b, and a plurality of the light sources 18.

Referring to FIGS. 9, 10, and 13, operation of this embodiment will be described. A plurality of the light sources 18 are arranged in parallel to emit parallel beams. The parallel beams emitted from the light sources 18 are converged by the second convex lens 14b onto a single point and then the parallel beams are restored by the first convex lens 14a. Other operation is similar to that of the foregoing embodiment and will not be described any longer.

The width of the flux can be desiredly varied in response to a ratio between focal distances of the first and the second convex lenses 14a and 14b. Accordingly, even if a large-scale light source such as a gas laser is used, the offset of the parallax can be small. In this case also, the characteristic of the foregoing embodiment described in conjunction with FIGS. 9 and 10 is not deteriorated.

In the three-dimensional moving image reproducing device illustrated in FIGS. 9 through 13, the converging point 16 is located on the focal plane of the image-forming lens 2. This is because the size of the polygonal mirror 3 is minimized by rendering the flux passing through the image-forming lens 2 into the parallel beams. Provided that the light beams emitted from the individual light sources 18 pass through the converging point 16, the converging point 16 may be located outside the focal plane of the image-forming lens 2. The reflecting surfaces of the polygonal mirror 3 are located at the focal point of the image-forming lens 2 so that a projected image produced by each individual light source 18 forms the parallactic image for the stereoscopic image 15 taken in the predetermined direction. This facilitates recording of the original image and processing of the image signal. However, the reflecting surfaces may not be located at the focal point. With respect to the vertical scanning operation, a cylindrical lens may be inserted between the galvano mirror 8 and the image-forming lens 2 so that the galvano mirror 8 forms an image on the focal point of the image-forming lens 2. In this event, the converging point 16 can be vertically scanned with the optical path on the horizontal scanning plane kept horizontal. Thus, reproduction and display can be easily carried out. The two-dimensional scanning operation may be carried out by any appropriate means other than the polygonal mirror and the galvano mirror.

In the example illustrated in FIG. 13, the light beams converged by the second convex lens 14b are converted by the first convex lens 14a into the parallel beams. This is optically equivalent to a structure that the image of the converging point of the second convex lens 14b is formed on the converging point 16 by the use of a composite lens comprising the first convex lens 14a and the image-forming lens 2. The first convex lens 14a may be omitted. Alternatively, another lens may be added therebetween. In the foregoing embodiment, the light sources 18 are arranged in parallel and the second convex lens 14b is used to converge the light beams. Alternatively, the light sources 18 may be arranged in a radial fashion to omit the second convex lens 14b.

When the image picked up by the three-dimensional moving image recording device described in conjunction with FIGS. 5 through 8 is displayed by the three-dimensional moving image reproducing device described in conjunction with FIGS. 9 through 13, the parallactic images formed by individual optical detectors and by the individual light sources are analogous in structure as far as their optical systems have analogous structures. In this event, the original object can be observed as the stereoscopic reproduction without any image processing by the computer. It will be recalled that the conventional system consumes a long time for computer processing because the stereoscopic image has an enormous amount of information and encounters a difficulty in dealing with the moving image. On the other hand, this invention enables recording and reproducing of the stereoscopic image in real time.

Figure 14:
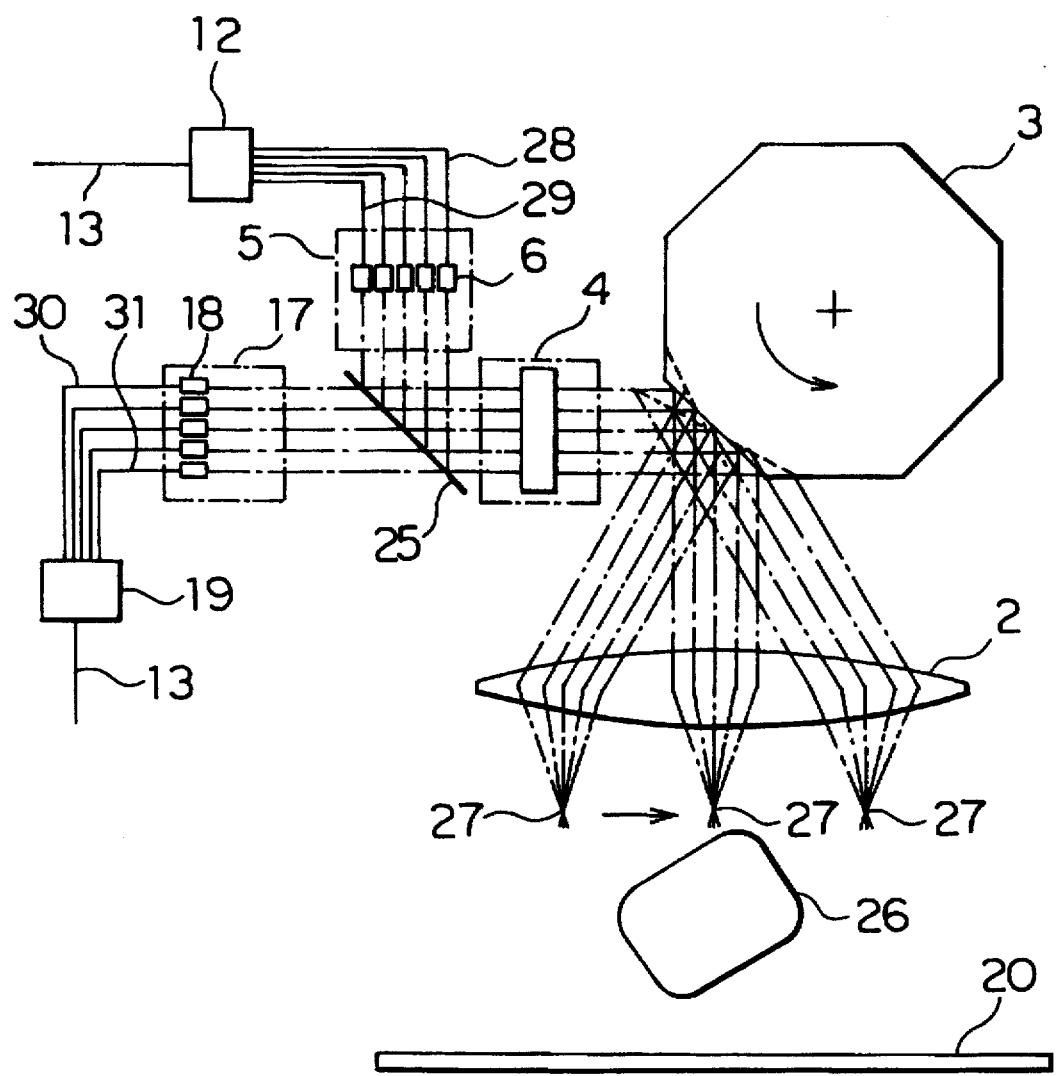
FIG. 14 is a view for describing a three-dimensional moving image recording/reproducing system according to a third embodiment of this invention.

FIG. 14 shows a three-dimensional moving image recording/reproducing system according to a third embodiment of this invention. Herein, the horizontal optical path is illustrated. An entire arrangement relating to the horizontal optical path comprises the vertical diffusion plate 20, the image-forming lens 2, the polygonal mirror 3, the vertical scanning section 4, a half mirror 25, the optical detector array 5, the video recorder 12, the transmission line 13, the light source array 7, and the modulator 19.

The structure of the vertical scanning section 4 is similar to that illustrated in FIG. 6. The arrangement of the vertical diffusion plate 20 is similar to that illustrated in FIG. 10. Accordingly, description will not be repeated here.

Upon picking up the image, the three-dimensional object 26 is located at a pickup/display position in the manner illustrated in FIG. 14. With a focal point 27 of the image-forming lens 2 used as the viewing point, the stereoscopic moving image is picked up through the half mirror 25 in the manner similar to the three-dimensional moving image recording device described above. Upon display, the flux emitted from the light source array 17 is converged onto the focal point 27 through the half mirror 25 in the manner similar to the three-dimensional moving image reproducing device described above, to display the parallactic image there. Then, the observer 21 observes the stereoscopic image at the pickup/display position through the vertical diffusion plate 20. Other operation is similar to the three-dimensional moving image recording device and the three-dimensional reproducing device described in the foregoing and will not be repeatedly described.

As illustrated in FIG. 14, the scanning portion and the imaging forming portion are commonly used by branching the optical path by the use of the half mirror 25. Thus, a single unit can serve as both the three-dimensional moving image recording device and the three-dimensional reproducing device to pick up and display the stereoscopic moving image. In addition, since the scanning portion and the image-forming portion are commonly used, the structures of the optical systems for pickup and for display can be easily rendered equivalent. Accordingly, image processing by a computer or any other special circuit is not required.

Referring to FIG. 14, description will be made more in detail. In FIG. 14, the parallactic image of the three-dimensional object 26 taken from leftside is transmitted through a first signal line 28. When the image on the first signal line 28 is displayed by the signal transmitted through a third signal line 30, the observer 21 observes the parallactic image as projected from leftside. On the other hand, the parallactic image of the three-dimensional object 26' taken from rightside is transmitted through a second signal line 29. When the image on the second signal line 29 is displayed by the signal transmitted through a fourth signal line 31, the observer 21 observes the parallactic image as projected from rightside. In other words, by reversing the connection between left and right transmission lines for the optical detectors 6 and the light sources 18, the problem of the pseudoscopic image is easily avoided without any correction by a computer or any other special circuit. This also applies to the three-dimensional moving image recording device and the three-dimensional moving image reproducing device described in the foregoing.

As described above, the three-dimensional moving image recording device according to the first embodiment of this invention comprises a plurality of the optical detectors optically arranged so as to totally receive the light beams within the limited solid angle among those light beams passing through the particular viewing point in the space. In this case, the optical detectors are located so as to individually receive the light beams advancing in the different directions, respectively, among those light beams passing through the same viewing point. The scanning mechanism vertically and horizontally scans the viewing point or the image of the viewing point at a high speed by the use of the optical scanning apparatus such as the polygonal mirror, the galvano mirror, and the AO crystal. The measuring mechanism electronically measures the time-varying luminous energy supplied from the scanning mechanism to the optical detectors to produce the measurement value, and records or transmits the measurement value. Thus, it is possible by a small-scale device to pick up the three-dimensional moving image which provides a natural visual sense to the observer.

The three-dimensional moving image reproducing device according to the second embodiment of this invention comprises a plurality of the light sources optically arranged so that the light beams emitted therefrom are totally converged onto the particular converging point in the space within the limited solid angle. In this case, the light sources are located so that the light beams are individually converged onto the same converging point from the different directions, respectively. The scanning mechanism vertically and horizontally scans the converging point or the image of the converging point at a high speed by the use of the optical scanning apparatus such as the polygonal mirror, the galvano mirror, and the AO crystal. The luminous energy of each individual light source is modulated in response to the electronic stereoscopic video information. Thus, it is possible by a small-scale device to display the stereoscopic moving image which can observed by the observer with the natural visual sense.

By combining the three-dimensional moving image recording device and the three-dimensional moving image reproducing device mentioned above to the optical path branching mechanism such as the movable mirror or the half mirror, the three-dimensional moving image recording/reproducing system is implemented by a single unit to carry out both pickup and display operations.

What is claimed is:

1. A three-dimensional moving image recording device comprising a plurality of optical detectors and a scanning mechanism, said optical detectors being arranged so as to totally receive light beams within a limited solid angle among those light beams passing through a particular viewing point in a space and to individually receive the light beams advancing in different directions, respectively, among those light beams passing through the same viewing point, said scanning mechanism being for vertically and horizontally scanning said viewing point or an image of said viewing point, said device further comprising a mechanism for electronically measuring a time-varying luminous energy incident to each of said optical detectors as a result of scanning by said scanning mechanism to obtain a measurement value and for recording or transmitting said measurement value.

2. A three-dimensional moving image recording device as claimed in claim 1, wherein said scanning mechanism comprises an optical scanning apparatus implemented by at least one of a polygonal mirror, a galvano mirror, and an AO crystal.

3. A three-dimensional moving image reproducing device comprising a plurality of light sources and a scanning mechanism, said plurality of light sources being arranged so that light beams emitted therefrom are totally converged onto a particular converging point in a space within a limited solid angle and are individually converged onto the same converging point from different directions, respectively, said scanning mechanism being for vertically and horizontally scanning said converging point or an image of said converging point, said device further comprising a modulating mechanism for modulating a luminous energy of each of said light sources in response to electronic stereoscopic video information.

4. A three-dimensional moving image reproducing device as claimed in claim 3, wherein said scanning mechanism comprises an optical scanning apparatus implemented by at least one of a polygonal mirror, a galvano mirror, and an acousto-optic crystal.

5. A three-dimensional moving image recording/reproducing system comprising:

a three-dimensional moving image recording device comprising a plurality of optical detectors and a scanning mechanism, said optical detectors being arranged so as to totally receive light beams within a limited solid angle among those light beams passing through a particular viewing point in a space and to individually receive the light beams advancing in different directions, respectively, among those light beams passing through the same viewing point, said scanning mechanism being for vertically and horizontally scanning said viewing point or an image of said viewing point, said device further comprising a mechanism for electronically measuring a time-varying luminous energy incident to each of said optical detectors as a result of scanning by said scanning mechanism to obtain a measurement value and for recording or transmitting said measurement value;

a three-dimensional moving image reproducing device comprising a plurality of light sources and a scanning mechanism, said plurality of light sources being arranged so that light beams emitted therefrom are totally converged onto a particular converging point in a space within a limited solid angle and are individually converged onto the same converging point from different directions, respectively, said scanning mechanism being for vertically and horizontally scanning said converging point or an image of said converging point, said device further comprising a modulating mechanism for modulating a luminous energy of each of said light sources in response to electronic stereoscopic video information; and an optical path branching mechanism such as a movable mirror and a half mirror for branching an optical path so that the position of the viewing point of said three-dimensional moving image recording device and the position of the converging point of said three-dimensional moving image reproducing device coincide with each other to thereby enable common use of a single scanning apparatus as the scanning mechanism both in said three-dimensional moving image recording device and in said three-dimensional moving image reproducing device.

* * * * *